United States Patent
Larsen et al.

(10) Patent No.: US 9,195,518 B1
(45) Date of Patent: Nov. 24, 2015

(54) SYSTEM AND METHOD FOR COMMUNICATING PRODUCTION VIRTUAL MACHINE ACCESS EVENTS TO A SERVICE APPLIANCE IN A VIRTUALIZED ENVIRONMENT

(75) Inventors: Samuel Larsen, San Carlos, CA (US); Gilad Arie Wolff, San Francisco, CA (US); Lionel Litty, Mountain View, CA (US); Marios Leventopoulos, Palo Alto, CA (US); James Kiryakoza, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 157 days.

(21) Appl. No.: 13/430,868

(22) Filed: Mar. 27, 2012

(51) Int. Cl.
 *G06F 3/00* (2006.01)
 *H04L 29/06* (2006.01)
 *G06F 9/54* (2006.01)

(52) U.S. Cl.
 CPC . *G06F 9/54* (2013.01); *H04L 63/10* (2013.01)

(58) Field of Classification Search
 CPC ... G06F 9/505; G06F 9/5083; G06F 11/3433; G06F 9/45533; G06F 9/54; H04L 63/10
 See application file for complete search history.

(56) References Cited

U.S. PATENT DOCUMENTS

| 6,061,349 | A * | 5/2000 | Coile et al. | 370/389 |
|---|---|---|---|---|
| 7,630,368 | B2 * | 12/2009 | Tripathi et al. | 370/389 |
| 8,448,174 | B2 * | 5/2013 | Miyamoto et al. | 718/102 |
| 8,533,343 | B1 * | 9/2013 | Beda et al. | 709/227 |
| 2004/0128394 | A1 * | 7/2004 | Knauerhase et al. | 709/229 |
| 2004/0128670 | A1 * | 7/2004 | Robinson et al. | 718/1 |
| 2010/0332489 | A1 * | 12/2010 | Benari et al. | 707/759 |
| 2011/0239268 | A1 * | 9/2011 | Sharp et al. | 726/1 |
| 2012/0182992 | A1 * | 7/2012 | Cowart et al. | 370/392 |

OTHER PUBLICATIONS

Jinpeng Wei, Managing Security of Virtual Machine Images in a Cloud Enviroment, Nov. 13, 2009.*
VMware vShield Brochure, published by VMware, Inc. and accessible at http://www.vmware.com/files/pdf/vmware-vshield_br-en.pdf, 2010.
VMware vShield Endpoint Datasheet, published by VMware, Inc. and accessible at http://www.vmware.com/files/pdf/vmware-vshield-endpoint-ds-en.pdf, 2010.

* cited by examiner

*Primary Examiner* — Lechi Truong

(57) ABSTRACT

A thin agent installed within a guest virtual machine (GVM) enables a service application to monitor events within the GVM and to perform certain system functions within the GVM. The thin agent maintains a distinct set of rules for selectively reporting system events to each different service application connected to the thin agent. A multiplexer executing within a virtualization software is configured to facilitate communication between a plurality of thin agents and a plurality of service applications. A services manager facilitates communication between new service applications and the thin agents. Each service application is able to advantageously add new functions to production GVMs without interrupting proper operation of the GVMs.

20 Claims, 6 Drawing Sheets

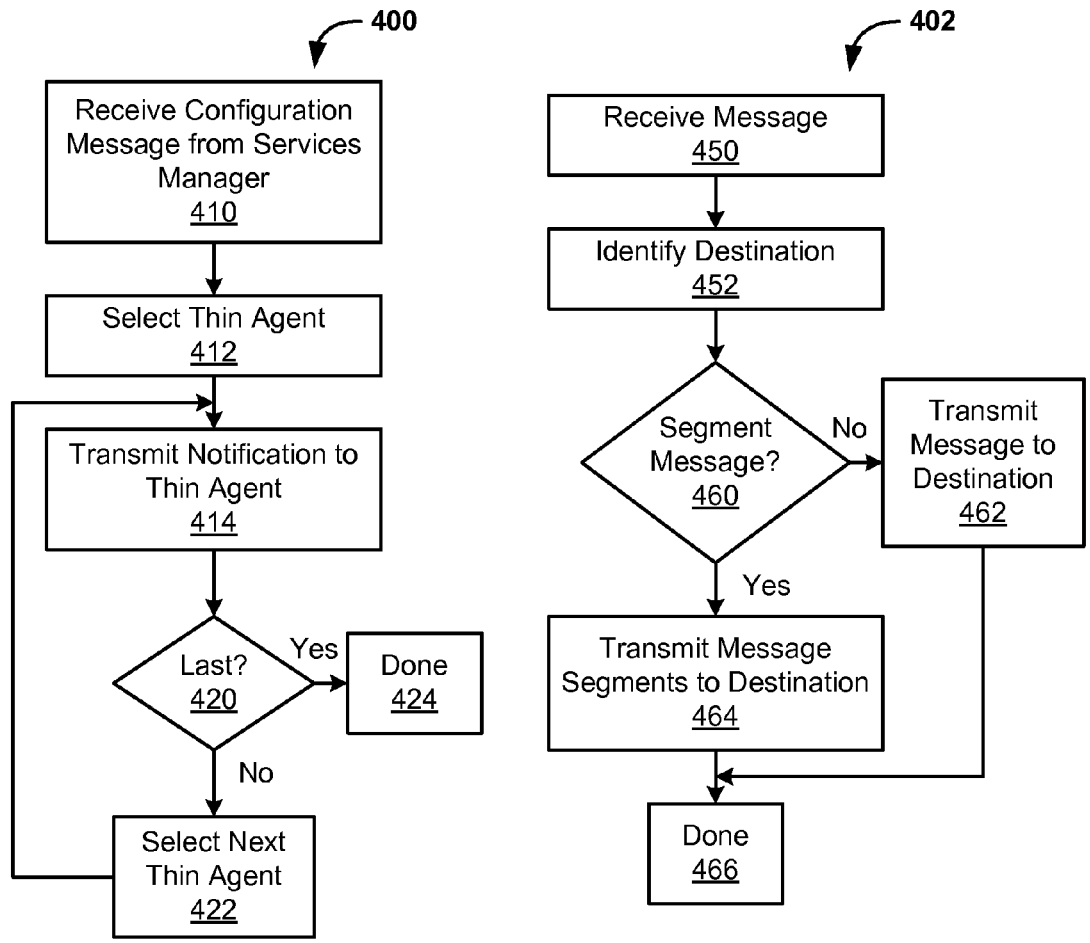
Figure 4A
Figure 4B
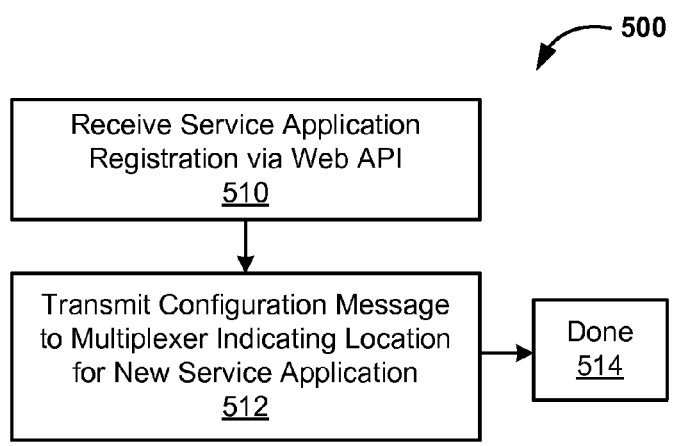
Figure 5

SYSTEM AND METHOD FOR COMMUNICATING PRODUCTION VIRTUAL MACHINE ACCESS EVENTS TO A SERVICE APPLIANCE IN A VIRTUALIZED ENVIRONMENT

BACKGROUND

Virtual machine (VM) systems provide a guest operating system (OS) with a virtual execution platform comprising virtual hardware subsystems configured to emulate corresponding physical hardware subsystems. An instance of the virtual execution platform configured to execute the guest OS is commonly referred to as a guest virtual machine (GVM). In a typical VM system, an arbitrary number of GVMs may execute on a common host server system. Each GVM may operate independently with respect to other GVMs and may communicate with the other GVMs, for example via an emulated network interface. The host server system should be configured with adequate computational and memory resources to support the GVMs.

Software applications may be installed and operated within the GVM as though installed and operated on a physical computer system. In many scenarios, a GVM may require certain system services in addition to generic OS functions. One type of system service is provided by an anti-virus software application, which is typically configured to scan user and system files for known virus signatures. Patterns and methods for detecting known viruses are typically maintained by the anti-virus software within a virus signature database that is updated from time to time as new viruses are discovered. If a known virus is found in a certain file, the file may be quarantined, disabled, or modified to remove the virus, based on policy settings for the anti-virus software.

Anti-virus software is conventionally installed within a guest OS and operates as if installed on a physical computer system. The virus signature database is typically updated via a network connection from the guest OS to an anti-virus service provider that identifies and publishes signatures of newly discovered viruses. As new virus signature database information becomes available, each guest OS is conventionally required to update a local copy of the virus signature database stored within the guest OS file system. Separately updating and storing numerous independent guest OS virus signature database copies is inefficient and may lead to discrepancies in anti-virus protection among a group of guest operating systems. In certain cases, the anti-virus software application also needs to be updated for each guest OS, compounding this inefficiency.

SUMMARY

A technique described herein provides system services, such as anti-virus scanning, in a VM environment. In one or more embodiments, an agent, such as a thin agent, installed within a VM enables a service application to monitor events within the VM and to perform certain system functions within the VM. The agent maintains a distinct set of rules for selectively reporting system events to each different service application connected to the agent. A multiplexer executing within virtualization software is configured to facilitate communication between a plurality of agents and a plurality of service applications. A services manager facilitates communication between new service applications and the agents. Each service application is able to advantageously add new functions to production VMs without interrupting proper operation of the VMs.

A method of communicating system events occurring within a VM to a service application running on a service appliance, according to an embodiment of the invention, includes the steps of receiving at an agent running inside the VM a notification of a system event, selecting by the agent a service application running on the service appliance to which the system event is to be reported, determining by the agent whether or not the system event should be communicated to the selected service application according to rules associated with the selected service application that are maintained by the agent, and communicating the system event from the agent to the selected service application if the agent determines that the system event should be communicated to the selected service application.

A method of accessing data of files managed by VMs by a service application running on a service appliance, in response to system events occurring within the VMs that are communicated to the service application, according to an embodiment of the invention, includes the steps of receiving at the service appliance, a notification of a system event occurring within a first VM and a notification of a system event occurring within a second VM, in response to the notifications, generating first and second access requests, the first access request including an address of the first VM and the second access request including an address of the second VM, and transmitting the first and second access requests to the VMs via a module that interconnects the VMs and the service appliance.

A method of communicating system events occurring within a VM to a service application running on a service appliance via a module that interconnects the VMs and the service appliance, according to an embodiment of the invention, includes the steps of receiving at the module first and second messages each containing an address of a service application, wherein the first message is from a first VM and the second message is from a second VM, transmitting from the module the first message according to the address in the first message, and transmitting from the module the second message according to the address in the second message.

A method of configuring agents running in VMs to communicate with a service application running on a service appliance, according to an embodiment of the invention, includes the steps of receiving at a management application a service registration message including an address for a new service application, and transmitting from the management application a configuration message including the address for the new service application to the agents of the VMs via a module that interconnects the VMs and the service appliance.

Further embodiments of the present invention include, without limitation, a non-transitory computer-readable storage medium that includes instructions that enable a processing unit to implement one or more aspects of the above methods as well as a computer system configured to implement one or more aspects of the above methods.

BRIEF DESCRIPTION OF THE DRAWINGS

FIG. 4A is a flow diagram of method steps, performed by a multiplexer, for notifying at least one thin agent that a new service application is available, according to an embodiment of the present invention.

FIG. 4B is a flow diagram of method steps, performed by the multiplexer, for forwarding a message between a thin agent and a service application, according to an embodiment of the present invention.

FIG. 5 is a flow diagram of method steps, performed by a services manager, for notifying the multiplexer that a new service application is available, according to an embodiment of the present invention.

DETAILED DESCRIPTION

Figure 1A:
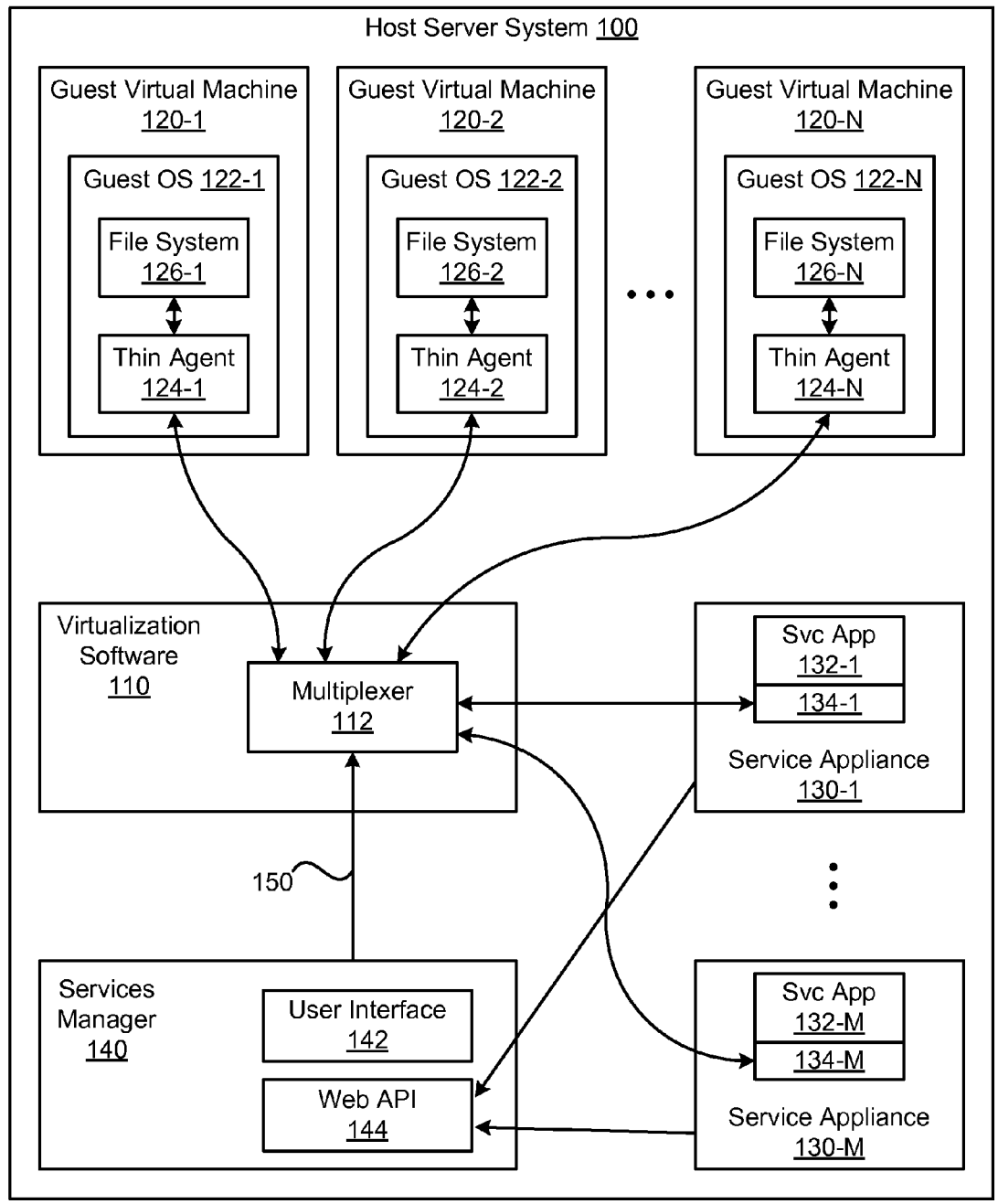
FIG. 1A is a block diagram of an exemplary computer system configured to implement one or more embodiments of the present invention.

FIG. 1A is a block diagram of an exemplary computer system configured to implement one or more embodiments of the present invention. Host server system 100 is built on an underlying hardware computing platform comprising one or more computer systems, each of which may be a desktop computer, laptop computer, tablet computer, mobile device such as a smart phone, server grade computer system, or any other suitable hardware computing platform, including systems based on different variations of the well-known ARM or x86 architecture platforms. Host server system 100 is configured to execute a virtualization software 110, one or more guest virtual machines (GVMs) 120, one or more service appliances 130, and a services manager 140.

Each GVM 120 is configured to execute a guest OS 122, which may be a commodity operating system, such as Microsoft Windows® operating system or Linux® operating system. Each guest OS 122 is further configured to include a thin agent 124 and a file system 126. In one embodiment, thin agent 124 is a kernel driver configured to access kernel state information, such as file system events and functions provided by guest OS 122 and file system 126. For example, thin agent 124 may register with the kernel for file access notifications, so that any time a file is accessed, thin agent 124 receives a notification including which file was accessed and the nature of the access. A given thin agent 124 is also configured to provide access for certain system operations to a service appliance 130. For example, thin agent 124-1 may be configured to provide service appliance 130-M with access to file system 126-1. File system 126 may be implemented as any file system that can provide conventional file operations, such as creation, deletion, modification and management functions.

Virtualization software 110 is configured to manage and operate host server system 100. Virtualization software 110 provides an execution environment for GVMs 120, service appliances 130, and services manager 140, and each may execute as an application within the execution environment. Virtualization software 110 may be implemented to include a kernel with hardware drivers for managing related hardware subsystems within host server system 100. In one embodiment, virtualization software 110 comprises a host operating system configured to provide system services to GVMs 120. In other embodiments, virtualization software 110 comprises a hypervisor configured to provide certain system services to GVMs 120. The hardware subsystems may include, without limitation, computational resources, mass storage, a networking interface, input/output interfaces, a display controller, and power management functions. A multiplexer 112 is configured to forward data messages between at least one thin agent 124 and at least one service appliance 130. In one embodiment, multiplexer 112 implements a forwarding table that includes at least one entry for each thin agent 124 and each service appliance 130. In such an embodiment, multiplexer 112 implements destination based forwarding, whereby a data message is constructed to include a destination address that corresponds to at least one thin agent 124 or at least one service appliance 130. When multiplexer 112 receives the data message, an associated destination address is matched to an entry within the forwarding table to determine a destination thin agent 124 or service appliance 130 for the data message. The destination thin agent 124 or service appliance 130 may be identified using a TCP/IP (transport control protocol/internet protocol) address, a socket number, a GVM identifier, or any other technically feasible identifier.

In one embodiment, multiplexer 112 is implemented as a user space application for execution within a virtualization software 110 user space. Multiplexer 112 communicates to thin agents 124 and service applications 130 via socket services provided by virtualization software 110. Multiplexer 112 may be configured to segment messages to limit the size of any one data message transmitted via the socket services. The socket services may be implemented as a shared memory message passing mechanism, whereby message data is written to a shared memory segment and an identifier to the shared memory segment is transmitted to a message recipient.

Each service appliance 130 includes a software service application 132 and an access library 134. A given service appliance 130 may execute as an application under control of virtualization software 110, and may be implemented as a virtual machine with a guest OS that is configured to execute service application 132. Access library 134 is configured so as to communicate with at least one thin agent 124 via the multiplexor 112. In one embodiment, access library 134 opens a different socket connection, for example via TCP/IP, to multiplexer 112 for communication with each different thin agent 124. In alternative embodiments, different message passing techniques may be implemented. For example, a shared memory message passing system may be implemented for communication between thin agents 124 and access libraries 134. In certain embodiments, service appliance 130-M is configured to execute on a remote host server system that is coupled to host server system 100 via a data network. In such embodiments, service appliance 130-M establishes data connections, such as TCP/IP connections, to one or more GVMs 120 within host server system 100 and operates substantially identically to other service appliances 130. Similarly, service appliance 130-1, executing within host server system 100, may connect to and provide services to GVMs operating within the remote host server system.

Access library 134 presents an application programming interface (API) (not shown) to service application 132. The API includes service calls for communicating with at least one thin agent 124. Communicating may include, without limitation, establishing a connection with thin agent 124, configuring thin agent 124, receiving event alerts from thin agent 124, and accessing system resources for a guest OS 122 associated with thin agent 124. In one embodiment, the API enables a connection from service application 132 to a specified thin agent 124 within a GVM 120 to be established through multiplexer 112. Furthermore, the API enables service application 132 to register certain event rules with thin agent 124. The event rules specify which system events within an associated guest OS 122 should or should not be reported to service application 132 via the socket connection. System events that may be reported include file system events, process events, memory events, registry events, and user events. Exemplary file system events include opening a file, closing a file, writing a file, and modifying a file. Exemplary process scheduling events include mapping a file for execution, starting a process, and stopping a process. Certain types of events, such as registry events, may depend on a particular version of guest OS 122. The API may specify that certain events not be reported. For example, service application 132 may request that no events be reported, or that only specific events be reported.

Access library 134 and thin agent 124 operate in concert to provide service application 132 with access to system resources for an associated guest OS 126. For example, service application 132-1 may request access to a certain file stored within a given file system 126-1. A read request to the file may be initiated by service application 132-1, which calls the API provided by access library 134-1 to initiate the read operation. Access library 134-1 then contacts thin agent 124-1 via multiplexer 112 with a read request to the file. Similarly, a write operation to the file may be initiated by service application 132-1, which calls the API with a write request. Access library 134-1 then transmits the write request to thin agent 124-1 via multiplexer 112, which performs the requested write operation to the file.

In one embodiment, access library 134 enables service application 132 to register callback functions that may be called by access library 134 when specified system events are reported by thin agent 124. Service application 132 is then able to take appropriate action when a specified callback function is called.

Services manager 140 is configured to receive an installation notice from a service application 132 upon installation or "power-on" of service application 132. In one embodiment, services manager 140 exposes a web API 144 that may be called using a hypertext transfer protocol ("http") by a newly installed service application 132. Each service application 132 is configured to contact services manager 140 via web API 144 and to register with services manager 140. Services manager 140 may also implement a user interface 142, such as a web browser accessible management interface, for managing service applications 130. Upon receiving a registration from a new service application 132, the service manager 140 transmits a configuration message 150 to multiplexer 112. The configuration message 150 instructs multiplexer 112 to inform each connected thin agent 124 of the presence of the new service application 132. Each thin agent 124 is then able to connect to service application 132. Each thin agent 124 maintains a different set of state information for each different service application 132. After a given thin agent 124 connects to a service application 132, the service application sends configuration information to thin agent 124. The configuration information is stored as state information associated with the particular service application 132.

In one embodiment, each service application 132 opens a different connection, such as a socket, to each thin agent 124. Each connection is facilitated by multiplexer 112, which maintains a corresponding set of socket connections. In alternative embodiments, the socket connections are implemented within virtualization software 110 using shared memory message passing.

Figure 1B:
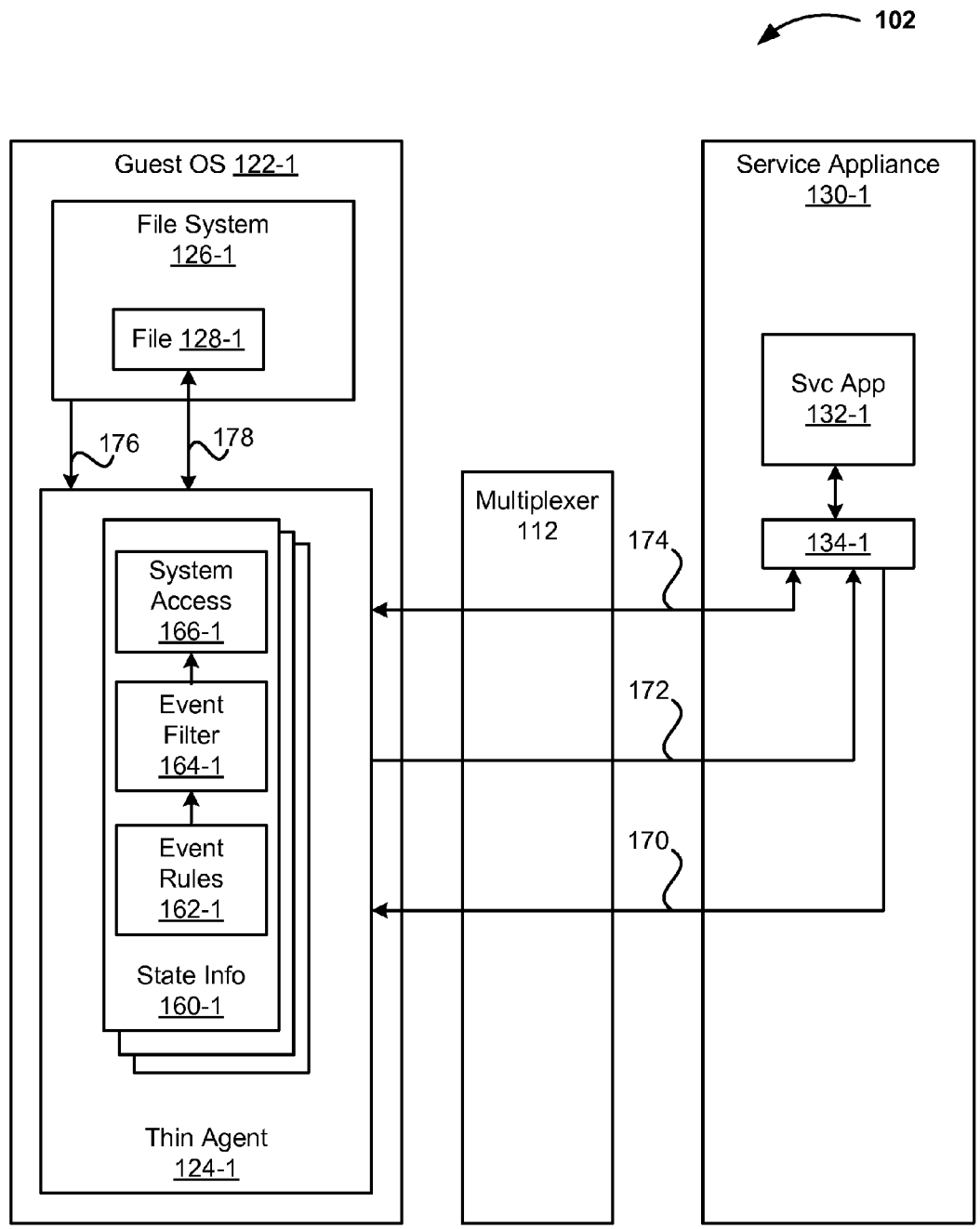
FIG. 1B illustrates communication between a thin agent and a service application, according to an embodiment of the present invention.

FIG. 1B illustrates communication between thin agent 124-1 and service application 132-1, according to an embodiment of the present invention. An event configuration message 170 from service application 132-1 is transmitted via access library 134-1 to multiplexer 112, which forwards the event configuration message 170 to thin agent 124-1. The event configuration message 170 defines which system events should be reported by thin agent 124-1 to service application 132-1. For example, the event configuration message 170 may instruct thin agent 124-1 to report file open events and file write events within file system 126-1. In one embodiment, a given service application 132 generates the event configuration message 170 subsequent to a given thin agent 124 establishing an initial connection with service application 132.

Each thin agent 124 maintains state information 160 for each corresponding service application 132 connected to thin agent 124. The state information 160 includes event rules 162 that define which system events should result in an event notification being transmitted to service application 132. An event filter 164 screens incoming system events transmitted as event signals 176 for matches based on the event rules. For example, state information 160-1 includes event rules 162-1 that apply to service application 132-1, an event filter 164-1 that screens event signals 176 based on the event rules 162-1, and a system access module 166-1, configured to facilitate access to system resources within guest OS 122-1. In this way, each instance of state information 160 reflects requirements for a corresponding service application 132.

When file 128-1 is opened or written within file system 126-1, thin agent 124-1 is informed by guest OS 122-1 via event signals 176. An event notification message 172 is generated by thin agent 124-1 when file 128-1 is opened or written within file system 126-1. Event notification message 172 is transmitted to access library 134-1 via multiplexer 112. Access library 134-1 then presents event notification message 172 to service application 132-1 for processing. In one embodiment, access library 134-1 presents event notification message 172 via a function call to a registered callback function within service application 132-1.

Upon notification that file 128-1 was opened within file system 126-1, service application 132 may begin scanning file 128-1 via system access module 166-1. Access messages 174 are transmitted between service application 132-1 and thin agent 124-1 via multiplexer 112. File data 178 from file 128-1 is transmitted to service application 132 using access messages 174.

In one embodiment, service application 132 comprises a security application, such an anti-virus application, configured to scan certain files within one or more file systems 126 residing in a corresponding guest OS 122. Service application 132 configures each thin agent 124 within each guest OS 122 to generate an event notification whenever a file or certain types of files are either created or written within an associated file system 126. Upon notification that a particular file has been created or written, service application 132 scans the file for known virus signatures based on information stored within a virus signature database associated with service application 132. The virus signature database includes patterns for known viruses and methods for detecting the known viruses. Service application 132 may be configured to also implement a policy for handling an infected file. For example, service application 132 may be configured to quarantine the file, delete infection-related data from the file, delete the file, or perform some other policy-defined action. In certain embodiments, a given service application 132 may request that different events be reported from different thin agents. For example, one thin agent 124-1 may be operating in conjunction with a production GVM 120-1 and need a high degree of protection, while another thin agent 124-2 may be operating in conjunction with a development GVM 120-2, where a high degree of protection is not desirable and may actually result in problematic interference in normal development activities.

Figure 2A:
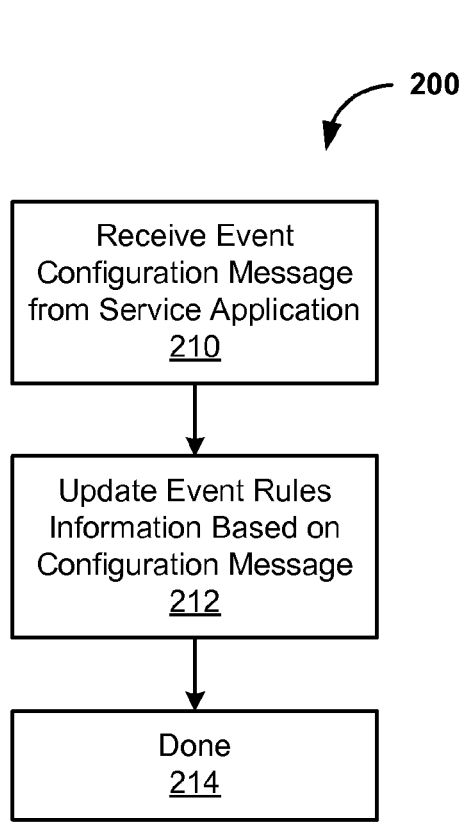
FIG. 2A is a flow diagram of method steps, performed by a thin agent, for configuring event rules information, according to an embodiment of the present invention.

FIG. 2A is a flow diagram of method 200, performed by a thin agent 124, for configuring event rules information, according to an embodiment of the present invention. Although the method steps are described in conjunction with the system of FIGS. 1A-1B, it should be understood that there are other systems in which the method steps may be carried out without departing the scope and spirit of the present invention.

Method 200 begins in step 210, where thin agent 124 receives an event configuration message from a service application 132. The event configuration message includes a specification that enumerates which system events, if any, should be subsequently reported by thin agent 124 to service application 132. In step 212, thin agent 124, which maintains event rules information for each connected service application 132, updates the event rules information for the corresponding service application 132 based on the configuration message. Method 200 terminates in step 214. In one embodiment, the event configuration message is transmitted from service application 132 to thin agent 124 via multiplexer 112.

Figure 2C:
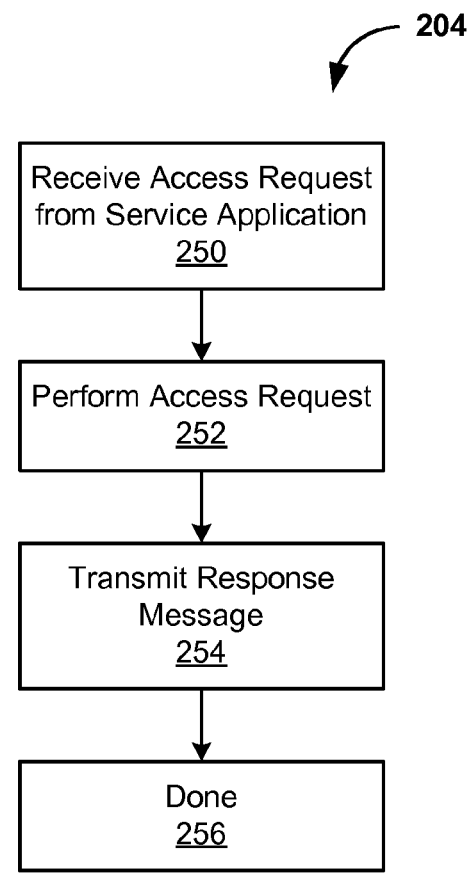
FIG. 2C is a flow diagram of method steps, performed by the thin agent, for responding to a request from a service application to access system resources, according to an embodiment of the present invention.
Figure 2B:
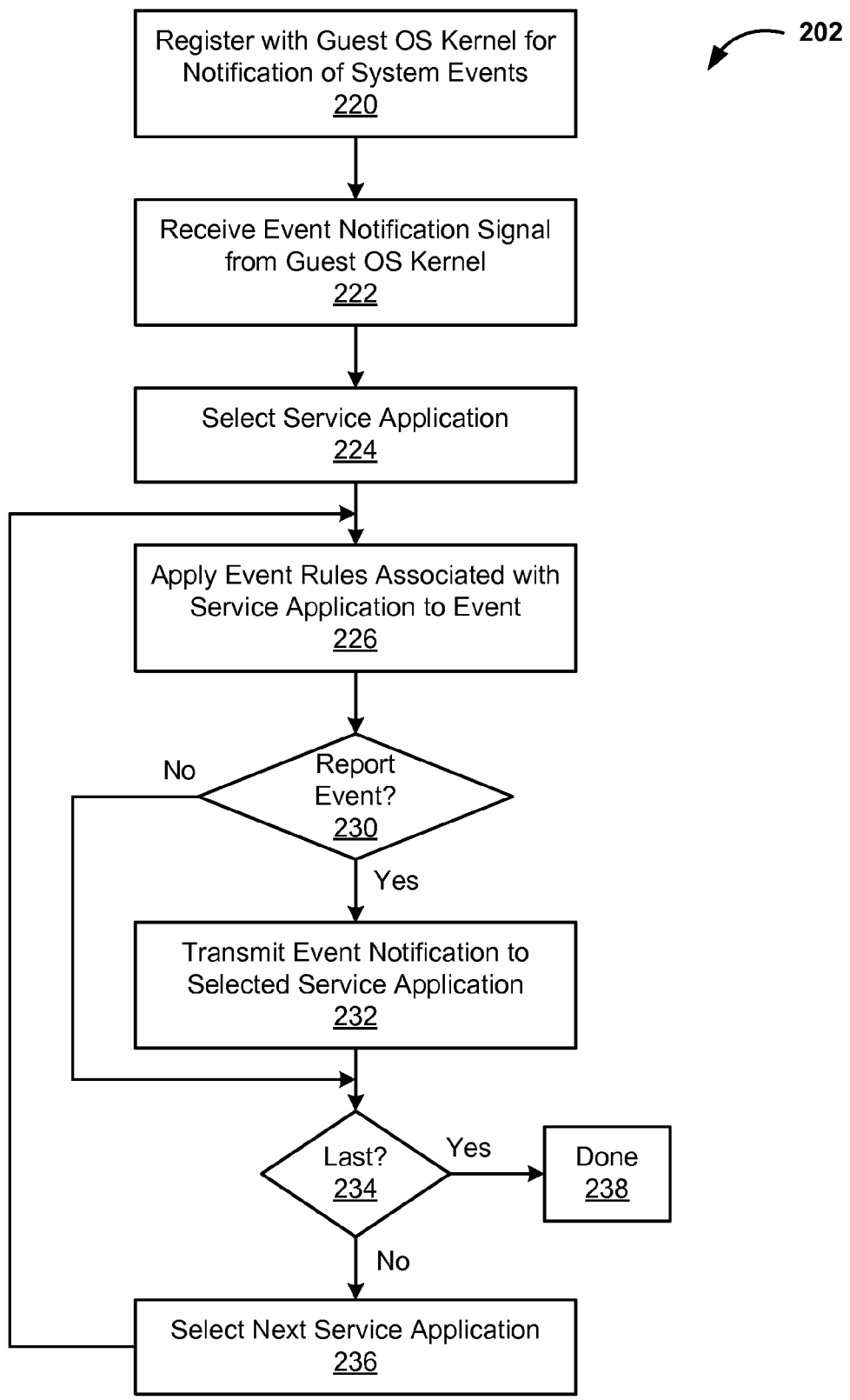
FIG. 2B is a flow diagram of method steps, performed by the thin agent, for transmitting an event notification to a service application, according to an embodiment of the present invention.

FIG. 2B is a flow diagram of method 202, performed by thin agent 124, for transmitting an event notification to service application 132, according to an embodiment of the present invention. Although the method steps are described in conjunction with the system of FIGS. 1A-1B, it should be understood that there are other systems in which the method steps may be carried out without departing the scope and spirit of the present invention.

Method 202 begins in step 220, where thin agent 124 registers with an associated guest operating system kernel to receive notification of system events. In one embodiment, this step is performed when thin agent 124 begins execution. In step 222, thin agent 124 receives an event notification signal from the guest operating system kernel. In step 224, thin agent 124 selects a service application 132 from a set of connected service applications. In step 226, thin agent 124 applies event rules associated with the selected service application 132 to the event reported via the event notification message to determine whether the event should be reported to the selected service application 132. For example, the event rules may specify that any writes to file system 126 (e.g., creating a new file or writing to an existing file) should be reported, whereas a network event or a file read event will not be reported to the selected service application 132. If, in step 230, the event should be reported, method 202 proceeds to step 232, where thin agent 124 transmits an event notification to the selected service application 132. The method then proceeds to step 234.

If, in step 234, the selected service application 132 is not the last service application connected to thin agent 124, method 202 proceeds to step 236, where a next service application is selected. Otherwise, if the selected service application 132 is the last service application connected to thin agent 124, method 202 terminates in step 238. Returning to step 230, if the event should not be reported, then method 202 proceeds to step 234.

Steps 222 through 238 of method 202 may be repeated for each new event notification from the guest operating system kernel. In one embodiment, the event notification is transmitted from thin agent 124 to service application 132 via multiplexer 112.

FIG. 2C is a flow diagram of method 204, performed by thin agent 124, for responding to a request from service application 132 to access system resources, according to an embodiment of the present invention. Although the method steps are described in conjunction with the system of FIGS. 1A-1B, it should be understood that there are other systems in which the method steps may be carried out without departing the scope and spirit of the present invention.

Method 204 begins in step 250, where thin agent 124 receives an access request from a service application 132. The access request may comprise any system operation availed to the guest operating system kernel. For example, the access request may include a read or write request to a file 128 within file system 126. The access request may include data, such as data to be written to file 128. In step 252, the thin agent performs the access request. In step 254, the thin agent generates and transmits a response message to service application 132. Method 204 terminates in step 256. In one embodiment, the access request and the response message are transmitted between thin agent 124 and service application 132 via multiplexer 112.

In one embodiment, methods 200, 202, and 204 are performed in sequence. In method 200, thin agent 124 is configured to report certain events to a particular service application 132. In method 202, thin agent 124 detects an event that needs to be reported to service application 132, which responds by requesting a certain access request. In method 204, thin agent 124 receives and performs the access request.

Figure 3A:
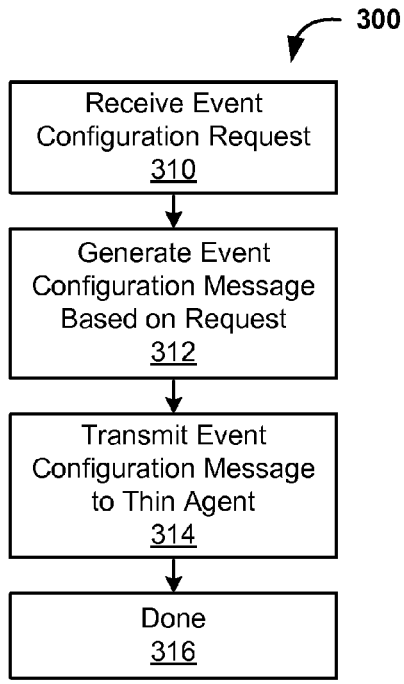
FIG. 3A is a flow diagram of method steps, performed by an access library, for configuring a thin agent, according to an embodiment of the present invention.

FIG. 3A is a flow diagram of method 300, performed by an access library 134, for configuring a thin agent 124, according to an embodiment of the present invention. Although the method steps are described in conjunction with the system of FIGS. 1A-1B, it should be understood that there are other systems in which the method steps may be carried out without departing the scope and spirit of the present invention.

Method 300 begins in step 310, where access library 134 receives an event configuration request from service application 132. The event configuration request indicates which system events should be reported by the thin agent 134 to service application 132. In one embodiment, the event configuration request comprises at least one function call to an API availed to service application 132 by access library 134. The event selection rules may be implemented as status flags associated with an enumerated list of possible events. Alternatively, the selection rules may be formulated using any suitable expression technique. In step 312, access library 134 generates an event configuration message based on the event configuration request. Unlike the event configuration request, which may comprise one or more API calls, the event configuration message comprises an ordered sequence of date, such as a data payload suitable for transmission via TCP/IP. In step 314, access library 134 transmits the event configuration message to thin agent 124. Method 300 terminates in step 316. In one embodiment the event configuration message is transmitted to thin agent 124 via multiplexer 112.

Figure 3B:
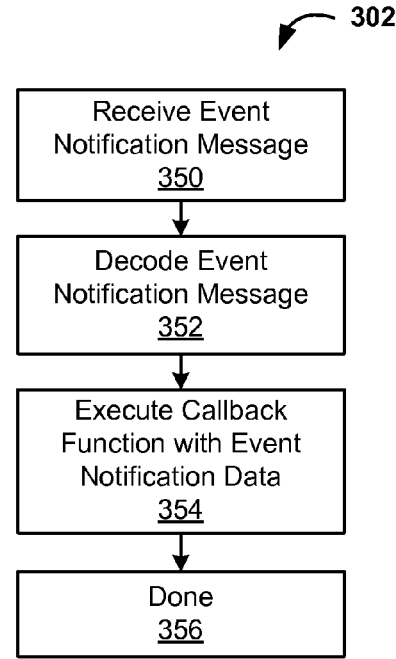
FIG. 3B is a flow diagram of method steps, performed by the access library, for receiving an event notification from the thin agent, according to an embodiment of the present invention.

FIG. 3B is a flow diagram of method 302, performed by access library 134, for receiving an event notification from thin agent 124, according to an embodiment of the present invention. Although the method steps are described in conjunction with the system of FIGS. 1A-1B, it should be understood that there are other systems in which the method steps may be carried out without departing the scope and spirit of the present invention.

Method 302 begins in step 350, where access library 134 receives an event notification message from thin agent 124. In step 352, access library 134 decodes the event notification message. For example, in an implementation where the event notification message is structured as an ordered sequence of data, access library 134 parses the ordered sequence of data to determine what type of event is being reported and to extract any related information. In step 354, access library 134 informs an associated service application 132 of the reported event by executing a callback function configured to include event notification data. The event notification data may include the type of event and any related information. Method 302 terminates in step 356. In one embodiment, the event notification message is transmitted from thin agent 124 to access library 134 via multiplexer 112.

In one embodiment, methods 300 and 302 are performed in sequence. In method 300, access library 134 configures a thin agent 124 based on one or more event configuration request generated by the associated service application 132. In method 302, access library 134 receives an event notification from the configured thin agent 124 and reports the event to the associated service application 132 via a callback function registered by service application 132 for the corresponding type of event.

Figure 3C:
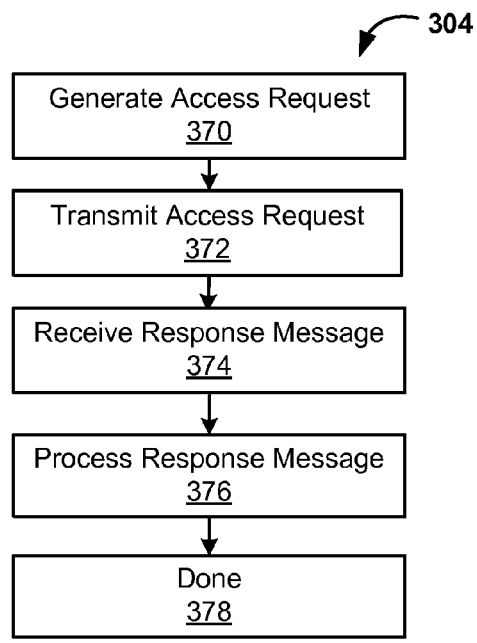
FIG. 3C is a flow diagram of method, performed by the service application, for performing an access request via the thin agent, according to an embodiment of the present invention.

FIG. 3C is a flow diagram of method 304, performed by service application 132, when service application 132 is notified of a system event occurring within a VM in accordance with method 302. For example, the system event may be a file open, and upon receiving this notification, service application 132 issues an access request to thin agent 124 to read the file being opened. Although the method steps are described in conjunction with the system of FIGS. 1A-1B, it should be understood that there are other systems in which the method steps may be carried out without departing the scope and spirit of the present invention.

Method 304 begins in step 370, where service application 132 generates the access request, and in step 372, transmits the request to access library 134, which in turn transmits the access request to thin agent 124. The access request includes an IP address of the VM that generated the system event. After acting on the access request, thin agent 124 replies to access library 134 with a response message, which may include a status identifier, for example, that indicates whether the access request was successfully performed. Access library 134 then transmits the response message to service application 132. In one embodiment, transmitting the response message from access library 134 to service application 132 is implemented via a callback function that alerts service application 132 that the response message is available. In step 374, service application 132 receives the response message from access library 134. In step 376, service application 132 processes the response message, according to application specific techniques. In the example of anti-virus scanning, where an anti-virus application executes an access request via thin agent 124 to read data from a suspect file that reside in file system 126, the response message may include data from the suspect file, and processing the response message by the anti-virus application comprises scanning the data for known virus signatures based on information stored within the virus signature database. The method terminates in step 378.

FIG. 4A is a flow diagram of method 400, performed by multiplexer 112, for notifying at least one thin agent 124 that a new service application 132 is available, according to an embodiment of the present invention. Although the method steps are described in conjunction with the system of FIGS. 1A-1B, it should be understood that there are other systems in which the method steps may be carried out without departing the scope and spirit of the present invention.

Method 400 begins in step 410, where multiplexer 112 receives a configuration message from services manager 140. The configuration message includes information related to a service application 132 that is either newly installed or recently powered-on within host server system 100. The configuration message includes at least an address, such as an IP address or socket number, for communicating with service application 132. In step 412, multiplexer 112, which maintains a list of all connected thin agents 124 and all service applications 132, selects a thin agent, such as thin agent 124-1, from the list of connected thin agents. In step 414, multiplexer 112 transmits a notification to the selected thin agent. The notification includes at least the address for communicating with service application 132. If, in step 420, the selected thin agent is not the last thin agent in the list of all connected thin agents, Method 400 proceeds to step 422, where multiplexer 112 selects a next thin agent. After step 422, method 400 proceeds back to step 414. Returning to step 420, if the selected thin agent is the last thin agent in the list of all connected thin agents, method 400 terminates in step 424.

FIG. 4B is a flow diagram of method 402, performed by multiplexer 112, for forwarding a message between a thin agent 124 and a service application 132, according to an embodiment of the present invention. Although the method steps are described in conjunction with the system of FIGS. 1A-1B, it should be understood that there are other systems in which the method steps may be carried out without departing the scope and spirit of the present invention.

Method 402 begins in step 450, where multiplexer 112 receives a message to be forwarded either from a thin agent 124 to a service application 132, or from a service application 132 to a thin agent 124. In step 452, multiplexer 112 identifies a destination address associated with the message, such as an IP address or a socket number. If, in step 460, the message needs to be segmented, method 402 proceeds to step 464, where the multiplexer transmits message segments comprising the message to the destination. A message may need to be segmented, for example, if the size of the message exceeds an ingress buffer configured to receive the message. Segmenting comprises decomposing the message into a set of segments that collectively form a complete representation of the message. Method 402 terminates in step 466. Returning to step 460, if the message does not need to be segmented, method 402 proceeds to step 462, where the multiplexer transmits the message to the destination.

In one embodiment, methods 400 and 402 are performed in sequence. In method 400, multiplexer 112 receives a configuration message from services manager 140 and notifies each thin agent 124 of a new service application 132 and an address with which to contact the new service application 132. In one usage scenario for method 402, multiplexer 112 forwards a message from a thin agent 124 to the new service application 132 to establish communication with service application 132. Service application 132 may subsequently reply to thin agent 124, causing multiplexer 112 to again perform method 402.

FIG. 5 is a flow diagram of method 500, performed by services manager 140, for notifying multiplexer 112 that a new service application 132 is available, according to an embodiment of the present invention. Although the method steps are described in conjunction with the system of FIGS. 1A-1B, it should be understood that there are other systems in which the method steps may be carried out without departing the scope and spirit of the present invention.

Method begins in step 510, where services manager 140 receives a service application registration via a web-based API. In one embodiment the web-based API comprises a hypertext markup protocol (http) stateless interface such as the well-know simple object access protocol (SOAP). It should be recognized that any technically feasible web-based API may be implemented without departing the scope and spirit of the present invention. A well-known uniform resource locator (URL) or other form of well-known address for services manager 140 may be implemented for the new service application 132 to establish communication with services manager 140 to enable the service application registration. In step 512, services manager 140 transmits a configuration message to multiplexer 112 indicating a location for the new service application 132. The configuration message includes at least an address, such as an IP address or socket number, for communicating with the new service application 132. Method 500 terminates in step 514.

As described previously in FIG. 4A, multiplexer 112 further transmits the address for communication with the new service application 132 to each connected thin agent 124. In this way, each thin agent is able to contact the new service application 132.

In one embodiment, when a GVM 120 is turned on, a corresponding thin agent 124 establishes contact with multiplexer 112. Furthermore, thin agent 124 may also contact multiplexer 112 periodically in the form of heartbeat messages, thereby enabling multiplexer 112 to maintain an up to date list of active thin agents 124. In certain embodiments, multiplexer 112 may forward the heartbeat messages to each connected service application 132. In other embodiments, thin agent 124 generates a heart beat message for delivery to each connected service application 132.

In one embodiment, the well-known virtual machine communication interface (VMCI) is implemented for communication between multiplexer 112 and the thin agents 124 and between multiplexer 112 and the service applications 132. It should be recognized that VMCI implements a shared memory communication mechanism with a socket application interface. In certain implementations, services manager 140 comprises a VMware product known as "vShield Manager" and each thin agent 124 within a GVM 120 comprises a "vShield Endpoint."

In sum, an architecture for virtual systems is disclosed for enabling service applications, executing as peers to one or more guest virtual machines, to perform useful functions within the one or more guest virtual machines. The guest virtual machines and the service applications execute in a user space of a virtualization software. A thin agent installed within a guest virtual machine is configured to monitor specified system events and to execute certain system functions on behalf of the service applications. The thin agent maintains a set of rules for selectively reporting system events to one or more connected service applications. A multiplexer executing in the user space acts as a central point of communication between the thin agents and the service applications. A services manager is configured to receive registration requests from newly installed or newly powered-on service applications. When a new service application registers with the services manager, the services manager provides an address for the new service application to the multiplexer. The multiplexer then informs each connected thin agent of the address of the new service application, allowing each thin agent to establish communication with the new service application.

One advantage of the present invention is that new functionality may be added to a GVM without interrupting operation of the GVM. Furthermore, when the service application is a security application, such as an anti-virus application, the functionality is added independently from the GVM and therefore presents a significantly smaller and more constrained attack surface compared to installing the security application within the GVM.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of communicating system events in a computer system having a virtualization software and a plurality of virtual machines (VMs) running on top of the virtualization software, wherein each of the VMs has a guest operating system executing therein and includes an agent that communicates with a module running in the virtualization software, said method of communicating system events occurring within the VMs to one or more service applications running on one or more service appliances via the module, said method implemented on a processor and comprising:
    receiving at the module first and second messages, wherein the first message is from a first agent within a first VM and contains an address of a first service application, and the second message is from a second agent within a second VM and contains an address of a second service application, and wherein the first agent generates the first message in response to being informed by the guest operating system executing in the first VM of the occurrence of a first system event within the first VM and determines, based on rules included in and maintained by the first agent, that the first service application is configured to receive messages corresponding to the first system event, and the second agent generates the second message in response to being informed by the guest operating system executing in the second VM of the occurrence of a second system event within the second VM and determines, based on rules included in and maintained by the second agent, that the second service application is configured to receive messages corresponding to the second system event;
    transmitting from the module the first message according to the address in the first message;
    transmitting from the module the second message according to the address in the second message;
    receiving at the module a configuration message from a management application running on top of the virtualization software, the configuration message identifying a new service application that is available to the VMs; and
    transmitting from the module the configuration message to each of the VMs.

2. The method of claim 1, wherein the address of the service application in the first message and the address of the service application in the second message are the same.

3. The method of claim 1, wherein the address of the service application in the first message and the address of the service application in the second message are different.

4. The method of claim 1, wherein transmitting the first message comprises segmenting the first message into two or more segments and transmitting each of the two or more segments of the first message according to the address in the first message, and transmitting the second message comprises segmenting the second message into two or more segments and transmitting each of the two or more segments of the second message according to the address in the second message.

5. The method of claim 1, wherein the first system event comprises a file system event.

6. The method of claim 1, wherein the configuration message further identifies which messages corresponding to the system events should be transmitted from the module.

7. The method of claim 1, wherein the rules included in the first agent and the rules included in the second agent are implemented as status flags associated with an enumerated list of possible events.

8. A non-transitory computer-readable storage medium containing a program which, when executed by one or more processors, performs operations for communicating system events in a computer system having a virtualization software and a plurality of virtual machines (VMs) running on top of the virtualization software, wherein each of the VMs has a guest operating system executing therein and includes an agent that communicates with a module running in the virtualization software, said operations for communicating system events occurring within the VMs to one or more service applications running on one or more service appliances via the module, the operations comprising:
    receiving at the module first and second messages, wherein the first message is from a first agent within a first VM and contains an address of a first service application, and the second message is from a second agent within a second VM and contains an address of a second service application, and wherein the first agent generates the first message in response to being informed by the guest operating system executing in the first VM of the occurrence of a first system event within the first VM and determines, based on rules included in and maintained by the first agent, that the first service application is configured to receive messages corresponding to the first system event, and the second agent generates the second message in response to being informed by the guest operating system executing in the second VM of the occurrence of a second system event within the second VM and determines, based on rules included in and maintained by the second agent, that the second service application is configured to receive messages corresponding to the second system event;
    transmitting from the module the first message according to the address in the first message; and
    transmitting from the module the second message according to the address in the second message;
    receiving at the module a configuration message from a management application running on top of the virtualization software, the configuration message identifying a new service application that is available to the VMs; and transmitting from the module the configuration message to each of the VMs.

9. The non-transitory computer-readable storage medium of claim 8, wherein the address of the service application in the first message and the address of the service application in the second message are the same.

10. The non-transitory computer-readable storage medium of claim 8, wherein the address of the service application in the first message and the address of the service application in the second message are different.

11. The non-transitory computer-readable storage medium of claim 8, wherein transmitting the first message comprises segmenting the first message into two or more segments and transmitting each of the two or more segments of the first message according to the address in the first message, and transmitting the second message comprises segmenting the second message into two or more segments and transmitting each of the two or more segments of the second message according to the address in the second message.

12. The non-transitory computer-readable storage medium of claim 8, wherein the first system event comprises a file system event.

13. The non-transitory computer-readable storage medium of claim 8, wherein the configuration message further identifies which messages corresponding to the system events should be transmitted from the module.

14. The non-transitory computer-readable storage medium of claim 8, wherein the rules included in the first agent and the rules included in the second agent are implemented as status flags associated with an enumerated list of possible events.

15. A system, comprising:
a processor; and
a memory, wherein the memory includes a program executable in the processor to perform operations for communicating system events in a computer system having a virtualization software and a plurality of virtual machines (VMs) running on top of the virtualization software, wherein each of the VMs has a guest operating system executing therein and includes an agent that communicates with a module running in the virtualization software, said operations for communicating system events occurring within the VMs to one or more service applications running on one or more service appliances via the module, the operations comprising:
receiving at the module first and second messages, wherein the first message is from a first agent within a first VM and contains an address of a first service application, and the second message is from a second agent within a second VM and contains an address of a second service application, and wherein the first agent generates the first message in response to being informed by the guest operating system executing in the first VM of the occurrence of a first system event within the first VM and determines, based on rules included in and maintained by the first agent, that the first service application is configured to receive messages corresponding to the first system event, and the second agent generates the second message in response to being informed by the guest operating system executing in the second VM of the occurrence of a second system event within the second VM and determines, based on rules included in and maintained by the second agent, that the second service application is configured to receive messages corresponding to the second system event;

transmitting from the module the first message according to the address in the first message; and transmitting from the module the second message according to the address in the second message;

receiving at the module a configuration message from a management application running on top of the virtualization software, the configuration message identifying a new service application that is available to the VMs; and transmitting from the module the configuration message to each of the VMs.

16. The system of claim 15, wherein the address of the service application in the first message and the address of the service application in the second message are the same.

17. The system of claim 15, wherein the address of the service application in the first message and the address of the service application in the second message are different.

18. The system of claim 15, wherein transmitting the first message comprises segmenting the first message into two or more segments and transmitting each of the two or more segments of the first message according to the address in the first message, and transmitting the second message comprises segmenting the second message into two or more segments and transmitting each of the two or more segments of the second message according to the address in the second message.

19. The system of claim 15, wherein the configuration message further identifies which messages corresponding to the system events should be transmitted from the module.

20. The system of claim 15, wherein the rules included in the first agent and the rules included in the second agent are implemented as status flags associated with an enumerated list of possible events.

* * * * *